United States Patent
Akisada et al.

(10) Patent No.: US 11,983,454 B2
(45) Date of Patent: May 14, 2024

(54) APPARATUS, METHOD AND STORAGE MEDIUM

(71) Applicant: Yokogawa Electric Corporation, Tokyo (JP)

(72) Inventors: Yukiyo Akisada, Tokyo (JP); Yasuki Sakurai, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 17/455,218

(22) Filed: Nov. 17, 2021

(65) Prior Publication Data

US 2022/0171591 A1 Jun. 2, 2022

(30) Foreign Application Priority Data

Dec. 2, 2020 (JP) .................. 2020-200595

(51) Int. Cl.
*G06F 3/14* (2006.01)
*G06F 3/01* (2006.01)
*G06F 40/20* (2020.01)
*G09B 5/02* (2006.01)
*G09B 19/00* (2006.01)

(52) U.S. Cl.
CPC .............. *G06F 3/14* (2013.01); *G06F 3/013* (2013.01); *G06F 40/20* (2020.01); *G09B 5/02* (2013.01); *G09B 19/003* (2013.01)

(58) Field of Classification Search
CPC ............ G06F 3/14; G06F 40/20; G06F 3/013; G09B 5/02; G09B 19/003
See application file for complete search history.

(56) References Cited

U.S. PATENT DOCUMENTS

| 5,857,028 A * | 1/1999 | Frieling ................. G06F 21/32 382/116 |
| 9,256,784 B1 * | 2/2016 | Taylor ................... G06F 3/0483 |
| 10,708,370 B2 * | 7/2020 | Barkie ................... G06Q 50/01 |
| 2008/0037953 A1 | 2/2008 | Kawamura |
| 2011/0126097 A1 | 5/2011 | Isono |

(Continued)

FOREIGN PATENT DOCUMENTS

| CN | 1954604 A | 4/2007 |
| CN | 102099775 A | 6/2011 |

(Continued)

OTHER PUBLICATIONS

Office Action issued for counterpart Japanese Application No. 2020-200595, issued by the Japanese Patent Office dated Jan. 31, 2023 (drafted on Jan. 23, 2023).

(Continued)

*Primary Examiner* — James T Tsai (57) ABSTRACT

There is provided an apparatus comprising: a display control unit configured to cause a display screen to display text; a first detection unit configured to detect a subject area which a user is looking at in the text; a second detection unit configured to detect a slow area where a moving speed of the subject area decreases; a storage unit configured to store a piece of location information of each slow area in the text; and a statistics unit configured to perform a statistical processing on the pieces of location information stored by the storage unit.

13 Claims, 5 Drawing Sheets

(56) References Cited

U.S. PATENT DOCUMENTS

| | | | |
|---|---|---|---|
| 2014/0324832 A1* | 10/2014 | Ionkov | G09B 7/06 |
| | | | 707/722 |
| 2016/0077586 A1 | 3/2016 | Taguchi | |
| 2017/0290504 A1 | 10/2017 | Khaderi | |
| 2018/0270283 A1* | 9/2018 | Bostick | G06Q 10/10 |
| 2019/0180636 A1 | 6/2019 | Lei | |
| 2019/0378164 A1* | 12/2019 | Eich | G06Q 30/0269 |
| 2021/0173899 A1* | 6/2021 | Haydon | G06F 21/105 |
| 2022/0093000 A1* | 3/2022 | Munich | G09B 17/003 |

FOREIGN PATENT DOCUMENTS

| | | | |
|---|---|---|---|
| CN | 105324733 A | 2/2016 | |
| CN | 109564563 A | 4/2019 | |
| CN | 110647680 A | 1/2020 | |
| CN | 111687863 A | 9/2020 | |
| EP | 2645270 A1 | 10/2013 | |
| JP | 2009210998 A | 9/2009 | |
| JP | 2012093599 A | 5/2012 | |
| JP | 2013245452 A | 12/2013 | |
| JP | 2017116894 A | 6/2017 | |
| JP | 2018097266 A | 6/2018 | |
| JP | 2019519053 A | 7/2019 | |
| JP | 6579120 B2 | 9/2019 | |
| JP | 6753331 B2 | 9/2020 | |
| WO | 2018043123 A1 | 3/2018 | |

OTHER PUBLICATIONS

Office Action issued for counterpart Chinese Application 202111458169.8, issued by The State Intellectual Property Office of People's Republic of China dted Nov. 1, 2023.

Hu Zhi-Gang et al., Reading Efficiency of Chinese Character on CNC Equipment Displays, Packaging Engineering vol. 37 Issue 24, Dec. 2016.

* cited by examiner

| 301 | | |
|---|---|---|
| EQUIPMENT ID | USER ID | OPERATION PRIVILEGE |
| K1111 | aaa1 | ○ |
| | aaa2 | × |
| | ... | ... |
| ... | ... | ... |

*FIG. 2*

| TEXT ID | LOCATION INFORMATION OF SLOW AREA | SECTION ID | USER ID |
|---|---|---|---|
| T1 | C1, P3, L11 | C1 | aaa1 |
| | C3, P40, L3 | C3 | aaa2 |
| | ... | ... | ... |
| ... | | ... | ... |

APPARATUS, METHOD AND STORAGE MEDIUM

The contents of the following Japanese patent application(s) are incorporated herein by reference:
2020-200595 filed in JP on Dec. 2, 2020

BACKGROUND

1. Technical Field

The present invention relates to an apparatus, a method, and a recording medium.

2. Related Art

In Patent document 1, it is described "when the line-of-sight detection unit detects an area where the reading speed of the user is slow with respect to the displayed message, a message for a predetermined first constituent unit including the slow area is displayed on the display unit in two or more display languages different from the predetermined display language at the same time."

PRIOR ART DOCUMENT

Patent Document

[Patent Document 1] Japanese patent No. 6579120

SUMMARY

In the first aspect of the present invention, an apparatus is provided. The apparatus may comprise a display control unit configured to cause a display screen to display text. The apparatus may comprise a first detection unit configured to detect a subject area which a user is looking at in the text. The apparatus may comprise a second detection unit configured to detect a slow area where a moving speed of the subject area decreases. The apparatus may comprise a storage unit configured to store a piece of location information of each slow area in the text. The apparatus may comprise a statistics unit configured to perform a statistical processing on the pieces of location information stored by the storage unit.

In the second aspect of the present invention, a method is provided. The method may comprise displaying text on a display screen. The method may comprise firstly detecting a subject area which a user is looking at in the text. The method may comprise secondly detecting a slow area where a moving speed of the subject area decreases. The method may comprise storing a piece of location information of each slow area in the text. The method may comprise performing a statistical processing on the pieces of location information stored by the storing.

In the third aspect of the present invention, a recording medium having recorded thereon a program is provided. The program may cause a computer to function as a display control unit configured to cause a display screen to display text. The program may cause a computer to function as a first detection unit configured to detect a subject area which a user is looking at in the text. The program may cause a computer to function as a second detection unit configured to detect a slow area where a moving speed of the subject area decreases. The program may cause a computer to function as a storage unit configured to store a piece of location information of each slow area in the text. The program may cause a computer to function as a statistics unit configured to perform a statistical processing on the pieces of location information stored by the storage unit.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention, but the following embodiments do not limit the claimed invention. In addition, not all combinations of features described in the embodiments are essential to the solution of the invention.

1. Configuration of System 1

Figure 1:
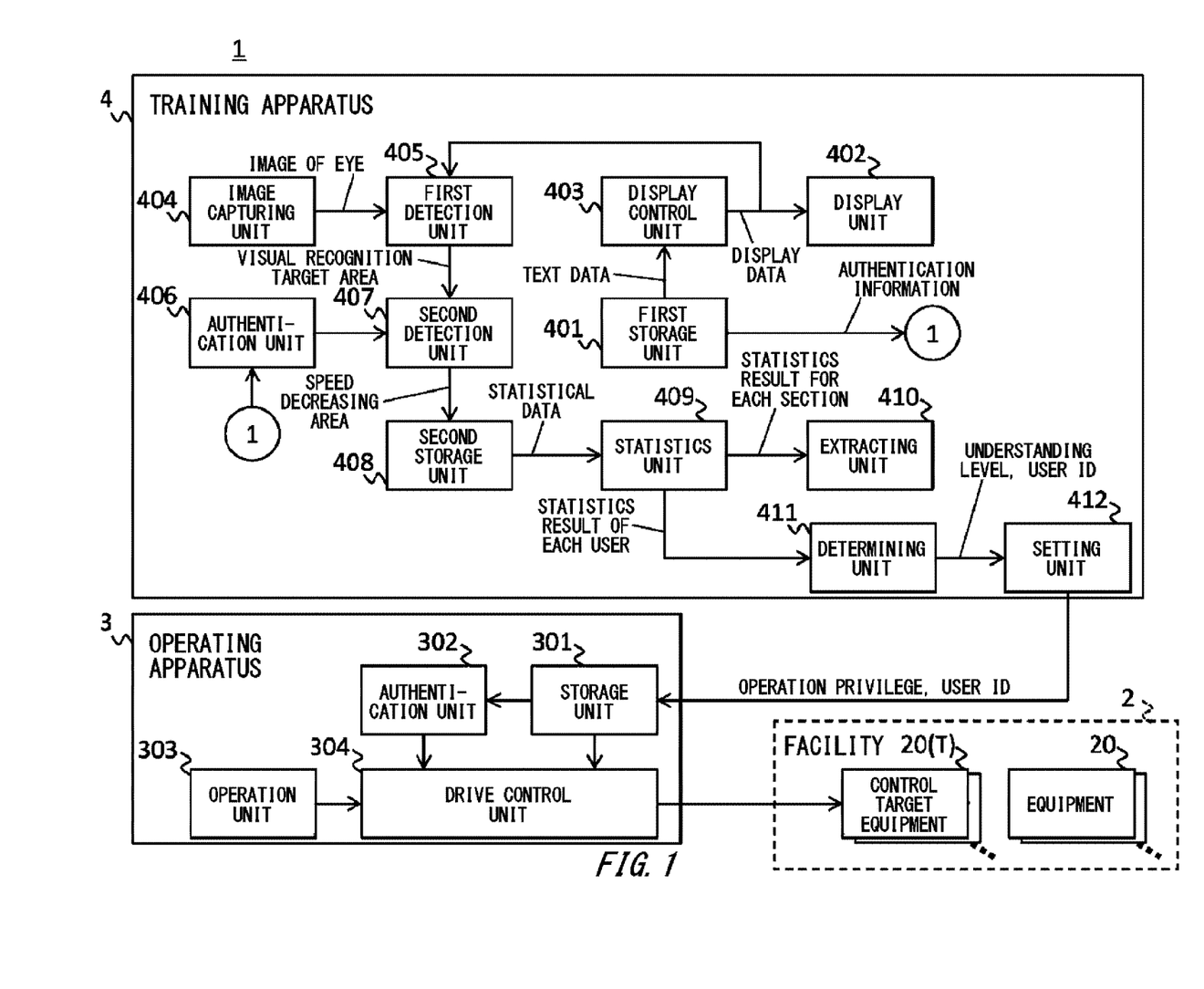
FIG. 1 shows a system 1 according to the present embodiment.

FIG. 1 shows a system 1 according to the present embodiment. The system 1 includes a facility 2, an operating apparatus 3, and a training apparatus 4.

1-1. Facility 2

The facility 2 has a piece or pieces of equipment 20. For example, the facility 2 may be a plant, or may be a combined apparatus constituted by combining the pieces of equipment 20. Examples of the plant include not only an industrial plant such as a chemical or bio plant but also a plant that manages and controls a well source such as a gas field or an oil field and its surrounding area, a plant that manages and controls electric power generation such as hydroelectric, thermal, or nuclear power generation, a plant that manages and controls environmental electric power generation such as solar or wind power generation, a plant that manages and controls water and sewerage or a dam, and the like.

1-1(1). Equipment 20

Each piece of the equipment 20 is an instrument, machinery, or an apparatus, and may be, for example, an actuator such as a valve, a pump, a heater, a fan, a motor, or a switch configured to control at least one of physical quantities such as a pressure, a temperature, a pH, a speed, and or a flow rate in a process of the plant. According to the present embodiment, by way of example, the facility 2 is provided with the pieces of equipment 20. Each piece of the equipment 20 may be of different types from each other, or partly, at least two or more pieces of the equipment 20 may be of the same type. Each piece of the equipment 20 may be controlled in a wired or wireless manner from the outside via a network which is not illustrated, or may be controlled manually.

At least one piece of the equipment 20 among the pieces of equipment 20 may be control target equipment 20(T) to be controlled by the operating apparatus 3. In a case where there are a plurality of pieces of the control target equipment 20(T), each piece of the control target equipment 20(T) may be different types from each other, or partly, at least two or more pieces of the control target equipment 20(T) may be the same type.

1-2. Operating Apparatus 3

The operating apparatus 3 controls each piece of the control target equipment 20(T) based on the operation by a user. The operating apparatus 3 has a storage unit 301, an authentication unit 302, an operation unit 303, and a drive control unit 304.

1-2(1). Storage Unit 301

Storage unit 301 stores authentication information and privilege information.

The authentication information is information for authenticating the user who uses the operating apparatus 3. The authentication information may be an account name and a password, or may be biometric information of the user (by way of example, information representing the fingerprint, iris, or vein pattern). The authentication information may be stored by the storage unit 301 in association with the user's identification information (which is also referred to as a user ID).

The privilege information represents a privilege to operate each piece of the control target equipment 20(T), of each user. The privilege information may have a plurality of data sets of identification information of the control target equipment 20(T) (which is also referred to as an equipment ID), the user ID, and the operation privilege of said user. Note that according to the present embodiment, by way of example, the operation privilege indicates the presence or absence of the privilege for all operations of the control target equipment 20(T).

1-2(2). Authentication Unit 302

The authentication unit 302 authenticates a user of the operating apparatus 3. The authentication unit 302 may perform the authentication by using the authentication information input from the user (by way of example, an account name and a password), or may perform the authentication by using biometric information of the user. The authentication unit 302 may perform the authentication with reference to authentication information stored in the storage unit 301. For example, the authentication may be performed by comparing authentication information input by the user with authentication information stored in the storage unit 301. The authentication unit 302 may deliver either of the result of the user being a legitimate person (which is also referred to as a legitimate authentication result) and the result of the user not being a legitimate person, to the drive control unit 304. If the authentication unit 302 obtains a legitimate authentication result, it may deliver the user ID of the user to the drive control unit 304 along with the authentication result.

1-2(3). Operation Unit 303

The operation unit 303 receives input of the operation instruction of the control target equipment 20(T) from the user. The operation unit 303 may deliver the input operation instruction to the drive control unit 304.

1-2(4). Drive Control Unit 304

When the legitimate authentication result is delivered from the authentication unit 302, the drive control unit 304 controls the control target equipment 20(T) in accordance with the operation instruction from the operation unit 303. The drive control unit 304 may read the operation privilege corresponding to the user ID delivered from the authentication unit 302, from the privilege information of the storage unit 301, and control the control target equipment 20(T) within the range of the operation privilege. According to the present embodiment, by way of example, the drive control unit 304 may control the control target equipment 20(T) in response to privilege information indicating the existence of the operation privilege having been read.

1-3. Training Apparatus 4

The training apparatus 4 is one example of the apparatus and assist a training of each user. The training apparatus 4 is one example of the apparatus and has a first storage unit 401, a display unit 402, a display control unit 403, an image capturing unit 404, a first detection unit 405, an authentication unit 406, a second detection unit 407, second storage unit 408, a statistics unit 409, an extracting unit 410, a determining unit 411, and a setting unit 412.

1-3(1). First Storage Unit 401

The first storage unit 401 stores a piece or pieces of text data and authentication information of each user.

Each piece of the text data may show an operating manual related to a piece or pieces of the control target equipment 20(T). The operating manual may entirely describe a single operation of the control target equipment 20(T), or may describe different operations of the control target equipment 20(T) for each chapter.

The authentication information is information for authenticating a user who uses the training apparatus 4. The authentication information may be an account name and a password, or may be biometric information of the user (by way of example, information representing the fingerprint, iris, or vein pattern). The authentication information may be stored in the first storage unit 401 in association with the user ID.

1-3(2). Display Unit 402

The display unit 402 has a display screen. The displaying content on the display screen may be controlled by the display control unit 403.

1-3(3). Display Control Unit 403

The display control unit 403 causes the display screen to display text. The display control unit 403 may read some text data from the first storage unit 401 to deliver a part of data to be displayed in the display screen (which is also referred to as display data) among the text, to the display unit 402 and the first detection unit 405.

1-3(4). Image Capturing Unit 404

The image capturing unit 404 captures an image of eyeballs of the user. The image capturing unit 404 may deliver the captured image of the eyeballs to the first detection unit 405. Note that although according to the present embodiment, by way of example, the image capturing unit 404 is provided in the circumferential part of the display screen of the display unit 402, it may be provided in another part.

1-3(5). First Detection unit 405

The first detection unit 405 detects a subject area which a user is looking at in the text displayed in the display screen (which is also referred to as a visual recognition target area).

The first detection unit 405 may detect a line of sight of the user.

In the present embodiment, by way of example, the first detection unit 405 may detect the line of sight by analyzing the image of eyeballs delivered from the image capturing unit 404. The first detection unit 405 may detect a gaze location of eyes from the image of eyeballs, and detects the straight line connecting the midpoint of eyes and the gaze location of the user, as the line of sight of the user.

The first detection unit 405 may detect a location, on the display screen, being passed through by the detected line of sight, as a location which the user is looking at on the display screen. Also, the first detection unit 405 may detect the part of text displayed in the location which the user is looking at, as the visual recognition target area, based on the display data delivered from the display control unit 403. The first detection unit 405 may deliver the location information of the detected visual recognition target area to the second detection unit 407.

Note that although in the present embodiment, by way of example, the visual recognition target area is some line in the text, it may be a part having different granularity, such as a paragraph or character string in the text. Also, the location information of the visual recognition target area in the text delivered to the second detection unit 407 may represent identification information of the text (which is also referred to as a text ID), and the chapter number, page number, and line number of said area.

1-3(6). Authentication Unit 406

The authentication unit 406 authenticates a user who uses the training apparatus 4. The authentication unit 406 may perform the authentication by using the authentication information input from the user (by way of example, an account name and a password), or may perform the authentication by using biometric information of the user. The authentication unit 406 may perform the authentication with reference to the authentication information stored in the first storage unit 401. For example, the authentication may be performed by comparing authentication information input by the user with authentication information stored in the first storage unit 401. The authentication unit 406 may deliver the user ID of the user to the second detection unit 407 in response to the legitimate authentication result being obtained.

1-3(7). Second Detection unit 407

The second detection unit 407 detects a slow area where the moving speed of a visual recognition target area decreases (which is also referred to as a speed decreasing area). The speed decreasing area may be a part, in the text, having granularity which is the same as that of the visual recognition target area, and may be, according to the present embodiment, by way of example, some line in the text.

The second detection unit 407 may detect a speed at which the visual recognition target area is shifted to the end side of the text, based on the location information of the visual recognition target area delivered from the first detection unit 405. For example, the moving speed of the visual recognition target area may represent the number of characters per minute. In the present embodiment, by way of example, the location information of the visual recognition target area represents the line number of the visual recognition target area, and thus the second detection unit 407 may calculate the number of characters per minute by multiplying the number of lines, shown in said location information, having moved in one minute by the number of characters in one line.

The second detection unit 407 may detect a visual recognition target area as the speed decreasing area in accordance with a moving speed becoming less than a reference speed. The second detection unit 407 may use a fixed value (by way of example, 500 characters per minute) as the reference speed. Alternatively, the second detection unit 407 may use a variable value as the reference speed. In this case, the second detection unit 407 may sequentially calculate an average speed of the moving speed of each user (by way of example, a speed of moving average calculated from a plurality of most recent moving speeds), and use a value based on the calculated average speed as the reference speed. The value based on the average speed may be a value calculated by subtracting a fixed speed from the average speed, or may be a value calculated by multiplying the average speed by a positive value less than 1.

The second detection unit 407 may deliver the detected location information of the speed decreasing area to the second storage unit 408. In the present embodiment, by way of example, the location information of the speed decreasing area in the text may represent a text ID, and the chapter number, page number, and line number of said area.

Also, the second detection unit 407 may deliver a user ID of a user authenticated by the authentication unit 406 to the second storage unit 408 in association with the location information of the speed decreasing area. Also, the second detection unit 407 may detect a section, in the text, including a speed decreasing area, and deliver identification information of said section (which is also referred to as a section ID) to the second storage unit 408 in association with the location information of the speed decreasing area.

Herein, the section may be a part resulting from dividing the text, and may be a part resulting from dividing the text in accordance with the content (for example, a chapter, paragraph, segment or the like of the text), or may be a part resulting from dividing the text in accordance with the number of characters. The granularity of a section in the text may be greater than the granularity of a visual recognition target area or a speed decreasing area. In the present embodiment, by way of example, a section may be a chapter of the text, and a section ID may show a chapter number.

1-3(8). Second Storage Unit 408

The second storage unit 408 is one example of the storage unit, and stores location information of each speed decreasing area in the text. The second storage unit 408 may store location information of each speed decreasing area for each user. In the present embodiment, by way of example, the second storage unit 408 may store statistical data having a plurality of data sets which associates location information of the speed decreasing area delivered from the second detection unit 407, a user ID, a section ID, and the like.

1-3(9). Statistics Unit 409

The statistics unit 409 performs a statistical processing on the location information of a plurality of speed decreasing areas stored by the second storage unit 408. The statistics unit 409 may perform the statistical processing by using the statistical data stored in the second storage unit 408.

A unit for analysis (which is also referred to as a classification or a scale) of the statistical processing may be a type of the text, may be a section in the text, or may be a user. For example, when the unit for analysis is a user, the statistics unit 409 may perform the statistical processing for each user, and when the unit for analysis is a section in the text, the statistics unit 409 may perform the statistical processing for each section.

The statistics unit 409 may deliver a statistics result to the extracting unit 410 and the determining unit 411. In the present embodiment, by way of example, the statistics unit 409 may deliver a statistics result for each section to the extracting unit 410. Also, the statistics unit 409 may deliver a statistics result of each user to the determining unit 411.

1-3(10). Extracting Unit 410

The extracting unit 410 extracts a section of the text detected as a section where the number of speed decreasing areas is greater than a reference number, based on the result of the statistical processing for each section performed by the statistics unit 409. In other words, the extracting unit 410 extracts a section in the text including speed decreasing areas more than a reference number. The reference number may be set arbitrarily. The extracting unit 410 may output the section ID of the extracted section to external equipment, the display unit 402, or the like.

1-3(11). Determining Unit 411

The determining unit 411 determines an understanding level of a user on the text based on the result of the statistical processing of each user performed by the statistics unit 409. For example, the determining unit 411 may calculate the understanding level on the text higher as the number of speed decreasing areas detected in the text is smaller.

Also, the determining unit 411 may determine the understanding level of the user for each section of the text. For example, the determining unit 411 may calculate the understanding level on a section higher as the number of speed decreasing areas detected in said section is smaller. The determining unit 411 may deliver the determined understanding level of at least one person as a user to the setting unit 412 in association with the user ID of said user.

1-3(12). Setting Unit 412

Based on the understanding level determined by the determining unit 411, the setting unit 412 sets a privilege to operate the object of the text (according to the present embodiment, by way of example, the control target equipment 20(T), which is the object of the operating manual). The setting unit 412 may set the operation privilege for each user. In the present embodiment, by way of example, the setting unit 412 may update the operation privilege associated with the user ID delivered from the determining unit 411 in accordance with the operation privilege delivered from the determining unit 411, in the storage unit 301 of the operating apparatus 3.

According to the above training apparatus 4, because the location information of each speed decreasing area in the text is stored, and the statistical processing is performed on the plurality of stored location information, and learning or revising the text can be performed efficiently.

Also, the statistical processing is performed for each location in the text, and therefore, a part which needs to be learned or revised, such as a part not understood well enough and a part hard to read in the text, can be detected.

Also, the section where the number of detected speed decreasing areas is greater than a reference number is extracted, and therefore, a section which needs to be learned or revised can certainly be detected.

Also, the statistical processing is performed for each user, and therefore, the part not understood well enough and the part hard to read can be detected for each user, and can be compared among users.

Also, the understanding level of a user on the text is determined based on the result of the statistical processing, and therefore, each text can be learned efficiently in accordance with the understanding level.

Also, the understanding level of the user is determined for each section of the text, and therefore, each section can be learned efficiently in accordance with the understanding level.

Also, the privilege to operate the object of the operating manual is set based on the determined understanding level, which can prevent a user with a low understanding level from being given the operation privilege.

2. Privilege Information

Figure 2:
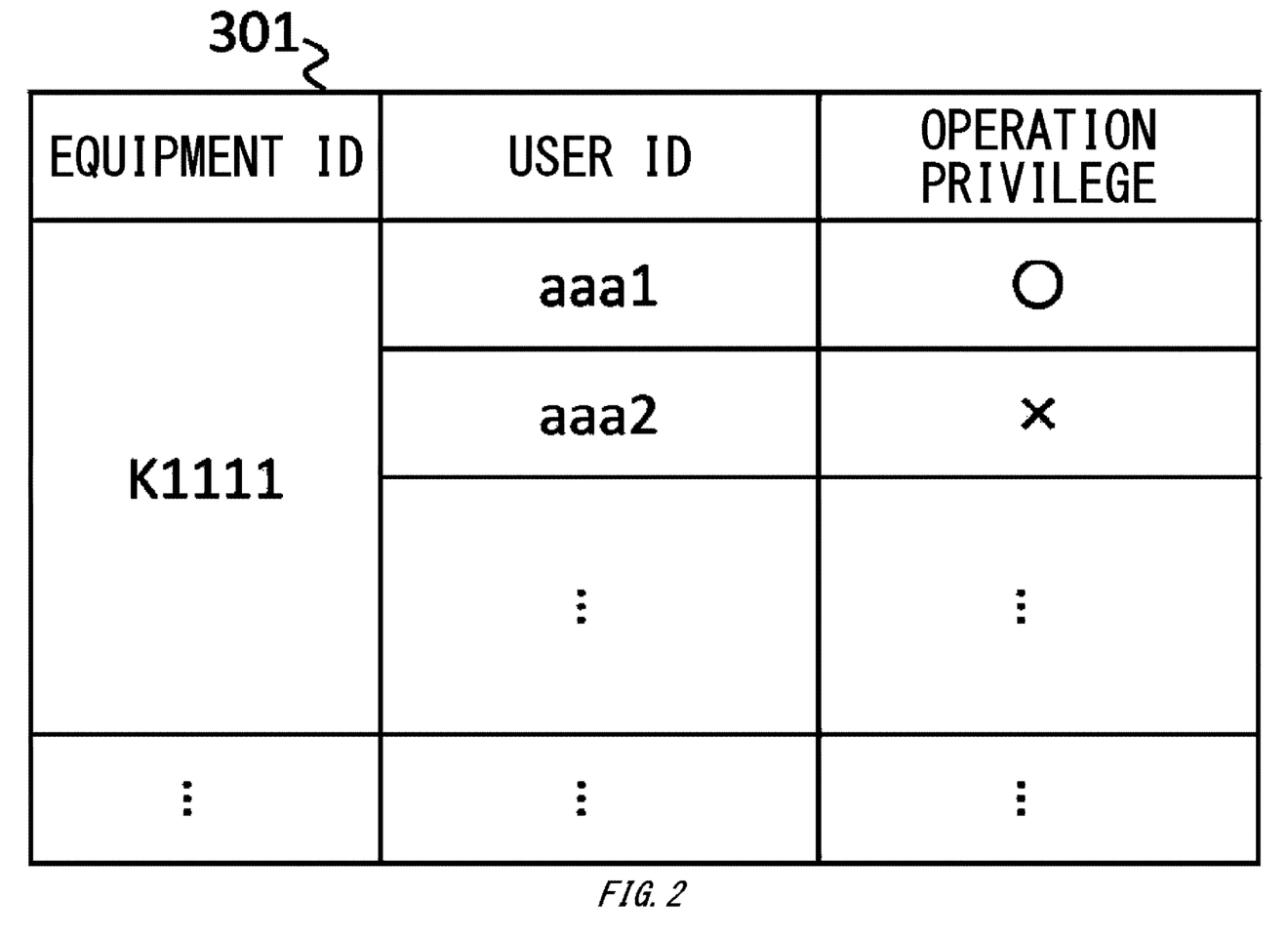
FIG. 2 shows privilege information stored in a storage unit 301.

FIG. 2 shows privilege information stored in the storage unit 301. The storage unit 301 may store at least one data set where an equipment ID of the control target equipment 20(T), a user ID, and an operation privilege of the user are associated, as privilege information. Note that the privilege information in the figure shows that the user with the user ID "aaa1" has a privilege to operate a piece of control target equipment 20(T) with the equipment ID "k1111," and the user with the user ID "aaa2" does not have the operation privilege.

3. Statistical Data

Figure 3:
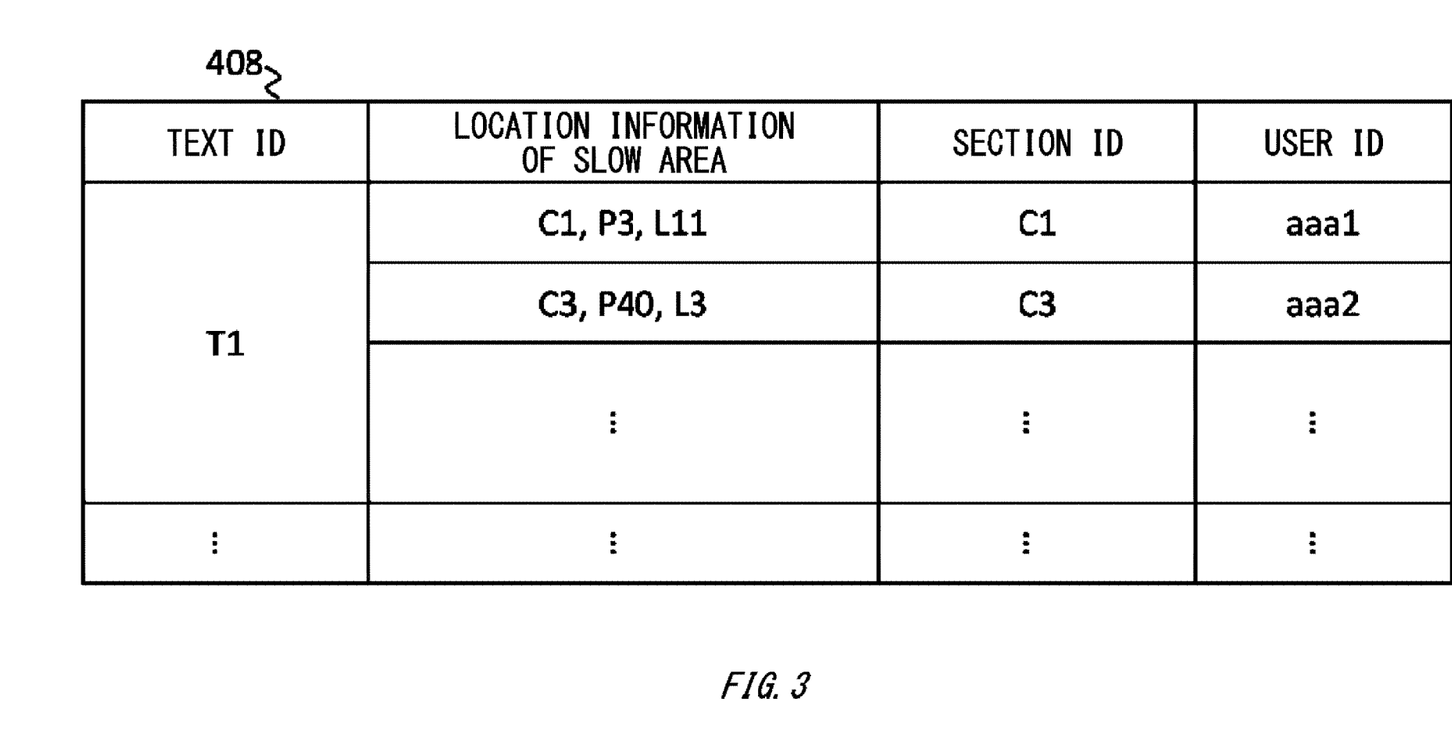
FIG. 3 shows statistical data stored in a second storage unit 408.

FIG. 3 shows statistical data stored in the second storage unit 408. The second storage unit 408 may store at least one data set where a text ID, the location information of a speed decreasing area, a section ID of a section including a speed decreasing area, and a user ID are associated, as statistical data. Note that the statistical data in the figure shows that a moving speed of a visual recognition target area decreases in the part "C, P3, L11" (the first chapter, the third page, the eleventh line), in the section with the section ID "C" (the first chapter), of the user with the user ID "aaa1", and regarding the user with the user ID "aaa2," a moving speed of a visual recognition target area decreases in the part "C3, P40, L3" (the third chapter, the fortieth page, the third line), in the section with the section ID "C3" (the third chapter), in the text with the text ID "T1."

4. Operation

Figure 4:
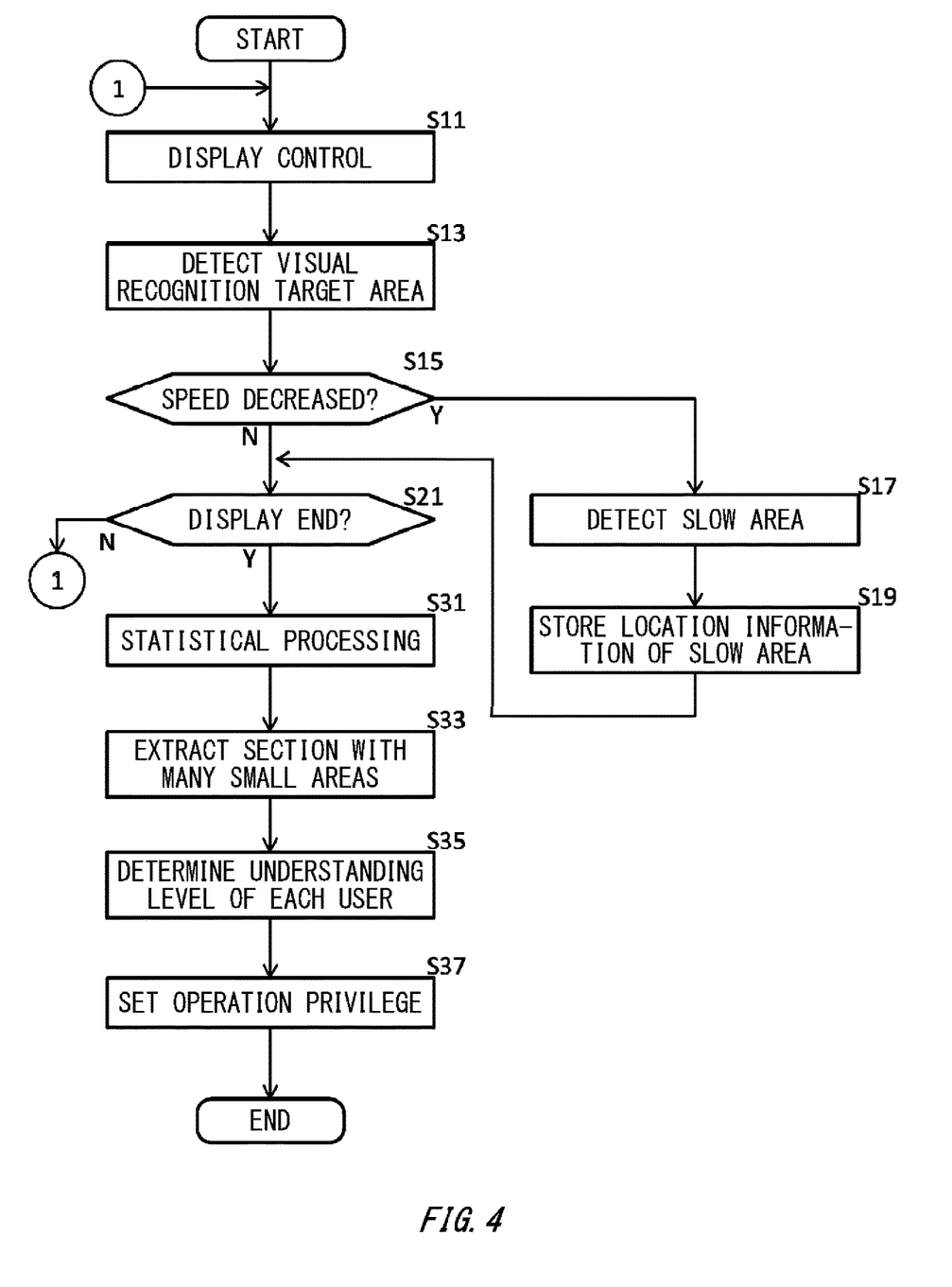
FIG. 4 shows the operation of a training apparatus 4.

FIG. 4 shows the operation of the training apparatus 4. The training apparatus 4 assists operation training of the control target equipment 20(T) by processes of steps S11 to S37. Note that when this operation is executed, a legitimate authentication result for a user authentication by the authentication unit 406 may be obtained in advance.

In step S11, the display control unit 403 causes the display screen to display text. In a case where a plurality of pieces of text data are stored in the first storage unit 401, the display control unit 403 may cause the display screen to display text of the text data selected by a user via an input unit, which is not illustrated. The display control unit 403 may scroll a display part of the text in a preset speed, or may scroll a display part based on a scrolling instruction input from a user via an input unit, which is not illustrated.

In step S13, the first detection unit 405 detects a visual recognition target area (in the present embodiment, by way of example, some line in the text) which a user is looking at in the text displayed.

In step S15, the second detection unit 407 judges whether a moving speed of a visual recognition target area has decreased. For example, the second detection unit 407 may judge whether the moving speed has been less than a reference speed (by way of example, 500 characters per minute). When the moving speed is judged not to decrease (step S15; N), the process may proceed to step S21. When the moving speed is judged to decrease (step S15; Y), the process may proceed to step S17.

In step S17, the second detection unit 407 detects a speed decreasing area. The second detection unit 407 may detect a visual recognition target area when a moving speed becomes less than a reference speed, as the speed decreasing area.

In step S19, the second storage unit 408 stores location information of the detected speed decreasing area. In the present embodiment, by way of example, the second storage unit 408 may store a data set where location information of the speed decreasing area delivered from the second detection unit 407, the user ID, the section ID, and the like are associated, to update statistical data.

In step S21, the display control unit 403 may judge whether displaying the text has ended. For example, the display control unit 403 may judge that the display has ended in response to the visual recognition target area having reached the end of the text. Also, the display control unit 403 may judge that the display has ended based on a termination instruction input from a user via input unit, which is not illustrated. When the display is judged not to have ended (step S21; N), the process may proceed to step S11. When the display is judged to have ended (step S21; Y), the process may proceed to step S31.

In step S31, the statistics unit 409 performs the statistical processing on a piece of stored location information of the plurality of speed decreasing areas. In the present embodiment, by way of example, the statistics unit 409 performs the statistical processing for each user and for each section of the text, respectively. The statistical processing may be aggregating the numbers of detected speed decreasing areas for each unit for analysis, or may be calculating a representative value of the detected numbers (by way of example, an average value, a mode value, or a median value).

In step S33, the extracting unit 410 extracts a section of the text detected as a section where the number of speed decreasing areas is greater than a reference number, based on the result of the statistical processing for each section.

In step S35, the determining unit 411 determines the understanding level of the user on the text based on the result of the statistical processing of each user. The determining unit 411 may determine the understanding level of the user for each section of the text.

In step S37, the setting unit 412 sets a privilege to operate the object of the text (according to the present embodiment, by way of example, the control target equipment 20(T) being the object of the operating manual), based on the determined understanding level. The setting unit 412 may set the operation privilege to be provided for the user in response to the user's understanding level being higher than a reference understanding level arbitrarily set in advance.

By way of example, when an operating manual of displayed text entirely describes an operation of a single piece of control target equipment 20(T), the setting unit 412 may set the privilege to operate said single piece of control target equipment 20(T) to be given to a user in response to the user's understanding level on said text being higher than a reference understanding level.

Also, when an operating manual of displayed text describes operations of pieces of control target equipment 20(T) different from chapter to chapter, the setting unit 412 may set the privilege to operate each piece of control target equipment 20(T) described in the operating manual in response to the user's understanding level on said text being higher than a reference understanding level. Alternatively, in response to a user's understanding level on a section, corresponding to each chapter in the text, being higher than a reference understanding level, the setting unit 412 may set the privilege to operate the control target equipment 20(T) described in the chapter of the section to be given to the user for each section.

5. Variations

Note that although in the above-described embodiment, it is described that the training apparatus 4 has a first storage unit 401, a display unit 402, an authentication unit 406, an extracting unit 410, a determining unit 411, and a setting unit 412, some of them may not be had. For example, when the training apparatus 4 does not have the first storage unit 401, the display control unit 403 may acquire text data from an external apparatus to cause the display unit 402 to display the text data.

Also, although it is described that the first detection unit 405 detects the line of sight of a user from a capturing image of eyeballs, the line of sight may be detected in other methods. In this case, the first detection unit 405 may have a sensor suite (not illustrated) to detect a line of sight or a gaze location of eyes of a user. The sensor suite may include a 6-axis sensor, a magnetic sensor, an electro-oculogram sensor or the like being put on a user's head (by way of example, the area around an eye). The 6-axis sensor may be a motion sensor having a 3-axis acceleration sensor and 3-axis gyro (angular velocity) sensor (which is also referred to as an inertial sensor), and may detect the direction of the user's head. The magnetic sensor may be, for example, a 3-axis geomagnetic sensor. The electro-oculogram sensor may detect a potential difference around an eye, to detect the direction of an eyeball. The first detection unit 405 may detect the line of sight in a conventionally known method by using such sensors. For example, when a sensor suite includes a 6-axis sensor and a magnetic sensor, the first detection unit 405 may detect the location of the midpoint of eyes and the direction of the head, and detect the straight line toward the front side of the head passing through the midpoint of the eyes, as the line of sight. When the sensor suite further includes an electro-oculogram sensor, the first detection unit 405 may detect the midpoint of eyes and a gaze location of the eyes, and detect a straight line connecting the midpoint of the eyes and the gaze location of the eyes, as the line of sight.

Also, although it is described that the operation privilege set by the setting unit 412 indicates the presence or absence of the privilege for all operations of the control target equipment 20(T), the presence or absence of the privilege for each operation may be indicated. In this case, the operating manual shown in text data may describe different operations of a single piece of control target equipment 20(T) for each chapter, and in response to a user's understanding level on a section, corresponding to each chapter in the text, being higher than a reference understanding level, the setting unit 412 may set the privilege of the operation described in the chapter of the section to be given to a user for each section.

Also, although it is described that the text data shows the operating manual related to the control target equipment 20(t), in addition to the control target equipment 20(t), or instead of the control target equipment 20(t), the operating manual related to software running on the system 1 may be shown.

In addition, various embodiments of the present invention may be described with reference to flowcharts and block diagrams, where blocks may represent (1) steps of processes in which operations are executed or (2) sections of apparatuses responsible for performing operations. Certain steps and sections may be implemented by a dedicated circuit, a programmable circuit supplied with a computer-readable instruction stored on a computer-readable medium, and/or a processor supplied with the computer-readable instruction stored on the computer-readable medium. The dedicated circuit may include digital and/or analog hardware circuits, and may include integrated circuits (IC) and/or discrete circuits. The programmable circuit may include reconfigurable hardware circuits including logical AND, OR, XOR, NAND, NOR, and other logical operations, flip-flops, registers, memory elements such as field-programmable gate arrays (FPGA) and programmable logic arrays (PLA), and the like.

Computer-readable media may include any tangible device that can store instructions for execution by a suitable device, such that the computer-readable medium having instructions stored therein is provided with an article of manufacture including instructions which may be executed to create means for performing operations specified in the flowcharts or block diagrams. Examples of computer-readable media may include an electronic storage medium, a magnetic storage medium, an optical storage medium, an electromagnetic storage medium, a semiconductor storage medium, and the like. More specific examples of computer-readable media may include a Floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, and the like.

The computer-readable instruction may include an assembler instruction, an instruction-set-architecture (ISA) instruction, a machine instruction, a machine dependent instruction, a microcode, a firmware instruction, state-setting data, or either a source code or an object code written in any combination of one or more programming languages, including an object-oriented programming language such as Smalltalk (registered trademark), JAVA (registered trademark), C++, or the like, and a conventional procedural programming language such as a "C" programming language or a similar programming language.

Computer-readable instructions may be provided to a processor of a general purpose computer, special purpose computer, or other programmable data processing apparatus, or to a programmable circuit, locally or via a local area network (LAN), wide area network (WAN) such as the Internet, or the like, to execute the computer-readable instructions to create means for performing operations specified in the flowcharts or block diagrams. Examples of processors include computer processors, processing units, microprocessors, digital signal processors, controllers, microcontrollers, and the like.

Figure 5:
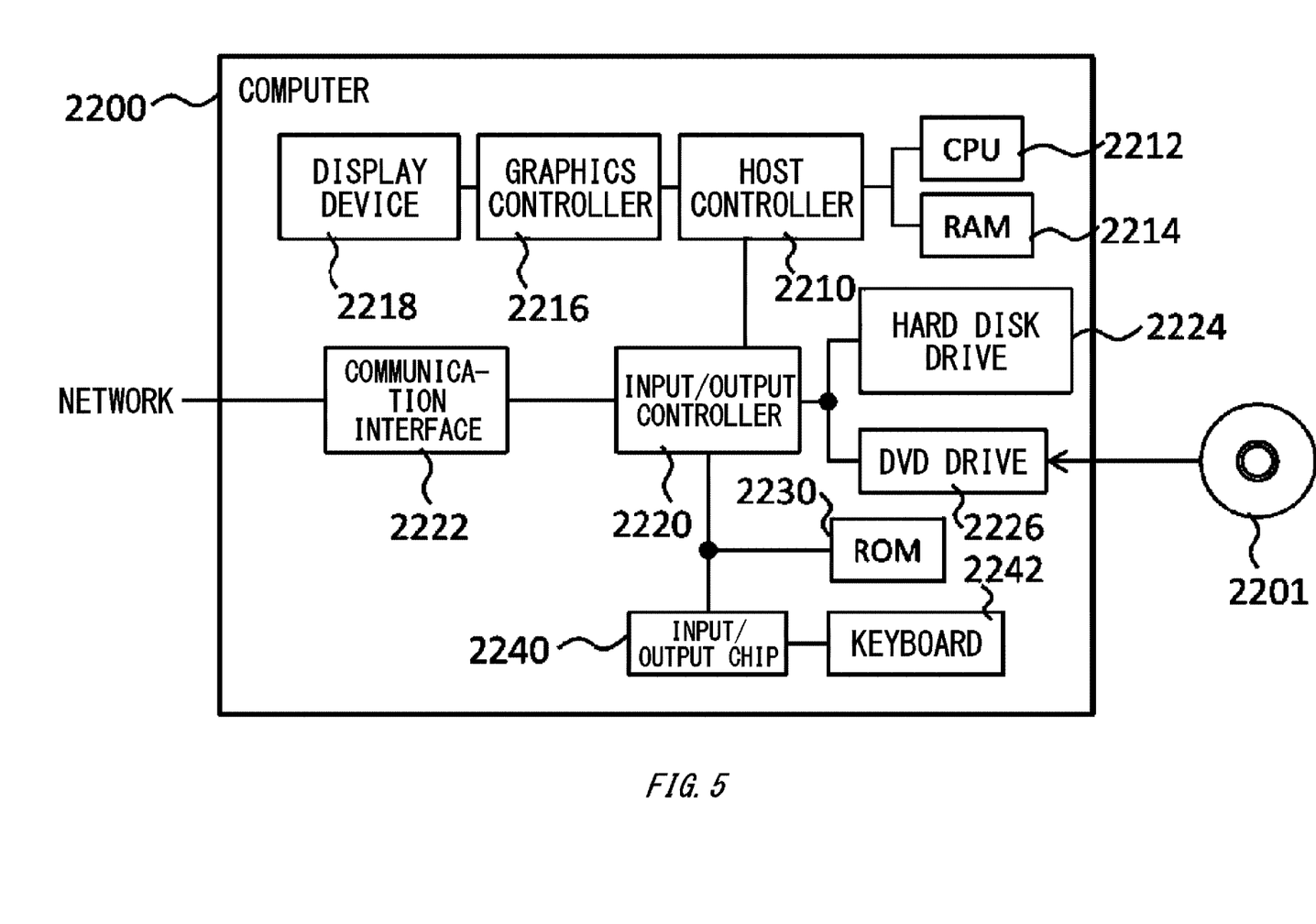
FIG. 5 shows an example of a computer 2200 in which a plurality of aspects of the present invention may be entirely or partially embodied.

FIG. 5 shows an example of a computer 2200 in which a plurality of aspects of the present invention may be entirely or partially embodied. A program that is installed in the computer 2200 can cause the computer 2200 to function as operations associated with apparatuses according to the embodiments of the present invention or one or more sections of the apparatuses thereof, or can cause the computer 2200 to perform the operations or the one or more sections thereof, and/or can cause the computer 2200 to perform processes of the embodiments according to the present invention or steps of the processes thereof. Such a program may be executed by a CPU 2212 to cause the computer 2200 to perform certain operations associated with some or all of the blocks of flowcharts and block diagrams described herein.

The computer 2200 according to the present embodiment includes the CPU 2212, a RAM 2214, a graphics controller 2216, and a display device 2218, which are mutually connected by a host controller 2210. The computer 2200 also includes input/output units such as a communication interface 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphics controller 2216 acquires image data generated by the CPU 2212 on a frame buffer or the like provided in the RAM 2214 or in itself, and causes the image data to be displayed on the display device 2218.

The communication interface 2222 communicates with other electronic devices via a network. The hard disk drive 2224 stores programs and data used by the CPU 2212 within the computer 2200. The DVD-ROM drive 2226 reads the programs or the data from the DVD-ROM 2201, and provides the hard disk drive 2224 with the programs or the data via the RAM 2214. The IC card drive reads programs and data from an IC card, and/or writes programs and data into the IC card.

The ROM 2230 stores, in itself, a boot program or the like that is executed by the computer 2200 during activation, and/or a program that depends on hardware of the computer 2200. The input/output chip 2240 may connect various input/output units via a parallel port, a serial port, a keyboard port, a mouse port, and the like to the input/output controller 2220.

A program is provided by computer-readable media such as the DVD-ROM 2201 or the IC card. The program is read from the computer-readable media, installed into the hard disk drive 2224, RAM 2214, or ROM 2230, which are also examples of computer-readable media, and executed by the CPU 2212. The information processing described in these programs is read into the computer 2200, resulting in cooperation between a program and the above-described various types of hardware resources. An apparatus or method may be constituted by realizing the operation or processing of information in accordance with the usage of the computer 2200.

For example, when communication is performed between the computer 2200 and an external device, the CPU 2212 may execute a communication program loaded onto the RAM 2214 to instruct communication processing to the communication interface 2222, based on the processing described in the communication program. The communication interface 2222, under control of the CPU 2212, reads transmission data stored on a transmission buffer processing region provided in a recording medium such as the RAM 2214, the hard disk drive 2224, the DVD-ROM 2201, or the IC card, and transmits the read transmission data to a network or writes reception data received from a network to a reception buffer processing region or the like provided on the recording medium.

In addition, the CPU 2212 may cause all or a necessary part of a file or a database to be read into the RAM 2214, the file or the database having been stored in an external recording medium such as the hard disk drive 2224, the DVD-ROM drive 2226 (DVD-ROM 2201), the IC card, or the like, and perform various types of processing on the data on the RAM 2214. The CPU 2212 then writes back the processed data to the external recording medium.

Various types of information, such as various types of programs, data, tables, and databases, may be stored in the recording medium to undergo information processing. The CPU 2212 may perform various types of processing on the data read from the RAM 2214, including various types of operations, information processing, condition judging, conditional branch, unconditional branch, search/replace of information, and the like, as described throughout this disclosure and designated by an instruction sequence of programs, and writes the result back to the RAM 2214. In addition, the CPU 2212 may search for information in a file, a database, or the like, in the recording medium. For example, when a plurality of entries, each having an attribute value of a first attribute associated with an attribute value of a second attribute, are stored in the recording medium, the CPU 2212 may search for an entry matching the condition whose attribute value of the first attribute is designated, from among the plurality of entries, and read the attribute value of the second attribute stored in the entry, thereby acquiring the attribute value of the second attribute associated with the first attribute satisfying the predetermined condition.

The above-described program or software modules may be stored in the computer-readable media on the computer 2200 or near the computer 2200. In addition, a recording medium such as a hard disk or a RAM provided in a server system connected to a dedicated communication network or the Internet can be used as the computer-readable media, thereby providing the program to the computer 2200 via the network.

While the embodiments have been used to describe the present invention, the technical scope of the present invention is not limited to the above-described embodiments. It is apparent to persons skilled in the art that various alterations or improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1 system
2 facility
3 operating apparatus
4 training apparatus
20 equipment
301 storage unit
302 authentication unit
303 operation unit
304 drive control unit
401 first storage unit
402 display unit
403 display control unit
404 image capturing unit
405 first detection unit
406 authentication unit
407 second detection unit
408 second storage unit
409 statistics unit
410 extracting unit
411 determining unit
412 setting unit
2200 computer
2201 DVD-ROM
2210 host controller
2212 CPU
2214 RAM
2216 graphics controller
2218 display device
2220 input/output controller
2222 communication interface
2224 hard disk drive
2226 DVD-ROM drive
2230 ROM
2240 input/output chip
2242 keyboard

What is claimed is:

1. An apparatus comprising:
at least one processor;
a display control unit configured to cause a display screen to display text using the at least one processor, wherein the text is an operating manual;
a first detection unit configured to detect a subject area which a user is looking at in the text using the at least one processor;
a second detection unit configured to detect a slow area where a moving speed of the subject area decreases using the at least one processor;
a storage unit configured to store location information of each slow area in the text using the at least one processor;

a statistics unit configured to perform a statistical processing on the location information of each slow area stored by the storage unit using the at least one processor; and a determining unit configured to determine an understanding level of the user of the text based on a result of the statistical processing by the statistics unit using the at least one processor, wherein the determining unit is configured to determine the understanding level of the user for each section of a plurality of sections included in the text; and a setting unit configured to set a privilege to operate an object of the operating manual for the user, based on the understanding level determined by the determining unit, using the at least one processor.

2. The apparatus according to claim 1, wherein the statistics unit is configured to perform the statistical processing for the each section of the plurality of sections included in the text.

3. The apparatus according to claim 2, further comprising an extracting unit configured to extract a section, of the plurality of sections, where the number of detected slow areas is greater than a reference number, based on a result of the statistical processing performed by the statistics unit, using the at least one processor.

4. The apparatus according to claim 1, wherein
the storage unit is configured to store the location information of each slow area in the text for a plurality of users including the user,
the statistics unit is configured to perform the statistical processing for each of the plurality of users, and
the determination unit is configured to determine the understanding level for each of the plurality of users.

5. A method comprising:
displaying text on a display screen, wherein the text is an operating manual;
firstly detecting a subject area which a user is looking at in the text;
secondly detecting a slow area where a moving speed of the subject area decreases;
storing location information of each slow area in the text;
performing a statistical processing on the pieces of location information stored as a result of the storing; and
determining an understanding level of the user of the text based on the result of the statistical processing, wherein the determining the understanding level of the user is for each section in the text; and
setting a privilege to operate an object of the operating manual for the user, based on the determined understanding level.

6. The method of claim 5, wherein the statistical processing is for the each section of the plurality of sections included in the text.

7. The method of claim 6, comprising extracting, based on a result of the statistical processing, a section of the plurality of sections where the number of detected slow areas is greater than a reference number.

8. The method of claim 5, comprising:
storing the location information of each slow area in the text for a plurality of users including the user;
performing statistical processing for each of the plurality of users; and
determining the understanding level for each of the plurality of users.

9. A non-transitory computer readable storage medium having recorded thereon a program that causes a computer to function as:
a display control unit configured to cause a display screen to display text, wherein the text is an operating manual;
a first detection unit configured to detect a subject area which a user is looking at in the text;
a second detection unit configured to detect a slow area where a moving speed of the subject area decreases;
a storage unit configured to store a piece of location information of each slow area in the text;
a statistics unit configured to perform a statistical processing on the pieces of location information stored by the storage unit; and
a determining unit configured to determine an understanding level of the user of the text based on a result of the statistical processing by the statistics unit, wherein the determining unit is configured to determine the understanding level of the user for each section of a plurality of sections included in the text; and
a setting unit configured to set a privilege to operate an object of the operating manual for the user, based on the understanding level determined by the determining unit.

10. The non-transitory computer readable storage medium of claim 9, wherein the statistics unit is configured to perform the statistical processing for the each section of the plurality of sections included in the text.

11. The non-transitory computer readable storage medium of claim 10, wherein the program further causes the computer to function as an extracting unit configured to extract a section, of the plurality of sections, where the number of detected slow areas is greater than a reference number, based on a result of the statistical processing performed by the statistics unit.

12. The non-transitory computer readable storage medium of claim 9, wherein:
the storage unit is configured to store the location information of each slow area in the text for a plurality of users including the user;
the statistics unit is configured to perform the statistical processing for each of the plurality of users; and
the determination unit is configured to determine the understanding level for each of the plurality of users.

13. The non-transitory computer readable storage medium of claim 9, wherein the determining unit is configured to determine the understanding level of the user for each section in the text.

* * * * *